(12) United States Patent
Kim et al.

(10) Patent No.: US 12,413,702 B2
(45) Date of Patent: Sep. 9, 2025

(54) DISPLAY DEVICE

(71) Applicant: SAMSUNG DISPLAY CO., LTD., Yongin-si (KR)

(72) Inventors: Beom Shik Kim, Yongin-si (KR); Jeong Woo Park, Yongin-si (KR); Hyun Jin Cho, Yongin-si (KR); Su Jung Huh, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 391 days.

(21) Appl. No.: 18/174,584

(22) Filed: Feb. 24, 2023

(65) Prior Publication Data

US 2023/0344980 A1    Oct. 26, 2023

(30) Foreign Application Priority Data

Apr. 20, 2022 (KR) .................. 10-2022-0049144

(51) Int. Cl.
- *H04N 13/356* (2018.01)
- *G02B 5/30* (2006.01)
- *G02B 30/27* (2020.01)

(52) U.S. Cl.
CPC ......... *H04N 13/356* (2018.05); *G02B 5/3016* (2013.01); *G02B 30/27* (2020.01)

(58) Field of Classification Search
CPC ..... H04N 13/356; G02B 30/27; G02B 5/3016
USPC ........................................................ 348/51
See application file for complete search history.

(56) References Cited

U.S. PATENT DOCUMENTS

| | | | |
|---|---|---|---|
| 6,069,650 A | 5/2000 | Battersby | |
| 7,058,252 B2 | 6/2006 | Woodgate et al. | |
| 7,821,711 B2 | 10/2010 | Kim et al. | |
| 9,541,688 B2 | 1/2017 | Kim et al. | |
| 2007/0008617 A1 | 1/2007 | Shestak et al. | |
| 2012/0008203 A1 | 1/2012 | Ijzerman et al. | |
| 2012/0099034 A1* | 4/2012 | Pijlman | H04N 13/359 349/15 |
| 2013/0335649 A1 | 12/2013 | Mather et al. | |
| 2016/0054631 A1* | 2/2016 | Lee | G02B 27/01 359/275 |
| 2016/0091726 A1* | 3/2016 | Yoon | H04N 13/305 349/86 |

FOREIGN PATENT DOCUMENTS

| | | |
|---|---|---|
| KR | 10-1323736 | 10/2013 |
| KR | 10-1365449 | 2/2014 |
| KR | 10-1977241 | 5/2019 |

* cited by examiner

*Primary Examiner* — Allen C Wong
(74) *Attorney, Agent, or Firm* — F. CHAU & ASSOCIATES, LLC

(57) ABSTRACT

A display device includes a display panel that includes a pixel, a variable light transmission layer disposed on the display panel and that includes liquid crystal molecules, and a lens layer disposed on the variable light transmission layer and that includes lenses and a polarization pattern. The polarization pattern overlaps a boundary area between adjacent lenses. The display device operates in a 2D image mode that provides a 2D image or a 3D image mode that provides a 3D image, and the polarization pattern transmits light when the display device operates in 2D image mode, and blocks light when the display device operates in 3D image mode.

24 Claims, 17 Drawing Sheets

2D MODE

3D MODE

DISPLAY DEVICE

CROSS REFERENCE TO RELATED APPLICATIONS

This application claims priority under 35 U.S.C. § 119 from Korean Patent Application No. 10-2022-0049144, filed on Apr. 20, 2022 in the Korean Intellectual Property Office, the contents of which are herein incorporated by reference in their entirety.

TECHNICAL FIELD

Embodiments of the disclosure are directed to a display device.

DISCUSSION OF THE RELATED ART

A display device can display an image, and includes a display panel such as an organic light emitting display panel or a liquid crystal display panel that include organic light emitting diodes (OLED), or a quantum dot electroluminescence devices (QD-EL).

A display device may include a lens structure that implements a stereoscopic image. However, when a display device includes a lens structure, interference between light that passes through the lens structure may occur. However, when a light blocking member is disposed to prevent light interference, external visibility may be damaged due to the light blocking member.

SUMMARY

Embodiments of the disclosure provide a display device in which optical crosstalk is reduced and image visibility is increased.

According to an embodiment of the disclosure, a display device includes a display panel that includes a pixel, a variable light transmission layer disposed on the display panel and that includes liquid crystal molecules, and a lens layer disposed on the variable light transmission layer and that includes lenses and a polarization pattern. The polarization pattern overlaps a boundary area between adjacent lenses. The display device can operate in a 2D image mode that provides a 2D image or a 3D image mode that provides a 3D image, and the polarization pattern transmits light when the display device operates in 2D image mode, and blocks light when the display device operates in 3D image mode.

According to an embodiment, the display panel provides input polarization light to the variable light transmission layer, and a polarization direction of the input polarization light and a polarization direction of the polarization pattern differ from each other.

According to an embodiment, the polarization direction of the input polarization light and the polarization direction of the polarization pattern differ by 90 degrees.

According to an embodiment, the lens layer further includes an outer layer disposed on the lenses and the polarization pattern, and the outer layer and the lenses form an interface.

According to an embodiment, the outer layer includes an isotropic polymer material.

According to an embodiment, when the display device operates in 2D image mode, light is transmitted through the interface without refraction.

According to an embodiment, the display panel provides input polarization light to the variable light transmission layer. When the display device operates in 2D image mode, a phase of the input polarization light changes by 90 degrees as the input polarization light passes through the variable light transmission layer, and a polarization direction of the input polarization light that passed through the variable light transmission layer is a same as a polarization direction of the polarization pattern.

According to an embodiment, when the display device operates in 3D image mode, light is refracted at the interface.

According to an embodiment, the display panel provides input polarization light to the variable light transmission layer. When the display device operates in 3D image mode, a phase of the input polarization light is maintained as the input polarization light passes through the variable light transmission layer, and a polarization direction that passed through the variable light transmission layer differs from a polarization direction of the polarization pattern.

According to an embodiment, the lenses have a first length, the polarization pattern has a second length, and the second length is less than the first length.

According to an embodiment, the second length is 0.2 times to 0.4 times the first length.

According to an embodiment, the polarization pattern is disposed on the lenses.

According to an embodiment, the polarization pattern is disposed on a rear surface of the lenses.

According to an embodiment, a portion of the polarization pattern fills a groove formed between the lenses.

According to an embodiment, the lenses have a lenticular lens structure.

According to an embodiment, the polarization pattern has a shape that extends in one direction.

According to an embodiment, the lenses include a plurality of micro lenses, and the plurality of micro lenses have at least one shape selected from a rectangle, a pentagon, a hexagon, a circle, or an oval.

According to an embodiment, the polarization pattern surrounds each of the plurality of micro lenses.

According to an embodiment, the lenses include lens liquid crystal molecules that are aligned in one direction, and the variable light transmission layer is driven in a twisted nematic (TN) liquid crystal mode.

According to an embodiment, a display device includes a display panel that includes a pixel that provides light, a variable light transmission layer disposed on the display panel and that includes liquid crystal molecules, and a lens layer disposed on the variable light transmission layer and that includes lenses and a polarization pattern. The polarization pattern overlaps a boundary area between the lenses, and the polarization pattern is an adaptive light blocking pattern in which light blocking is determined by an alignment state of the liquid crystal molecules of the variable light transmission layer.

According to an embodiment of the disclosure, a display device includes a display panel that includes a pixel, a variable light transmission layer disposed on the display panel and that includes liquid crystal molecules, a lens layer disposed on the variable light transmission layer and that includes lenses and a polarization pattern formed between adjacent lenses, and an outer layer disposed on the lenses and the polarization pattern, where the outer layer and the lenses form an interface. The display device operates in a 2D image mode that displays a 2D image or a 3D image mode that displays a 3D image. When the display device operates in 2D image mode, light is transmitted through the interface without refraction, and when the display device operates in the 3D image mode, light is refracted at the interface.

According to an embodiment, the display panel provides input polarization light to the variable light transmission layer. When the display device operates in 2D image mode, a phase of the input polarization light changes by 90 degrees as the input polarization light passes through the variable light transmission layer, and a polarization direction of the input polarization light that passed through the variable light transmission layer is a same as a polarization direction of the polarization pattern.

According to an embodiment, the display panel provides input polarization light to the variable light transmission layer. When the display device operates in 3D image mode, a phase of the input polarization light is maintained as the input polarization light passes through the variable light transmission layer, and a polarization direction of the input polarization light that passed through the variable light transmission layer differs from a polarization direction of the polarization pattern.

According to an embodiment, the display panel provides input polarization light to the variable light transmission layer, and a polarization direction of the input polarization light and a polarization direction of the polarization pattern differ from each other.

According to an embodiment of the disclosure, a display device is provided that has reduced optical crosstalk and increased image visibility.

DETAILED DESCRIPTION

Figure 1:
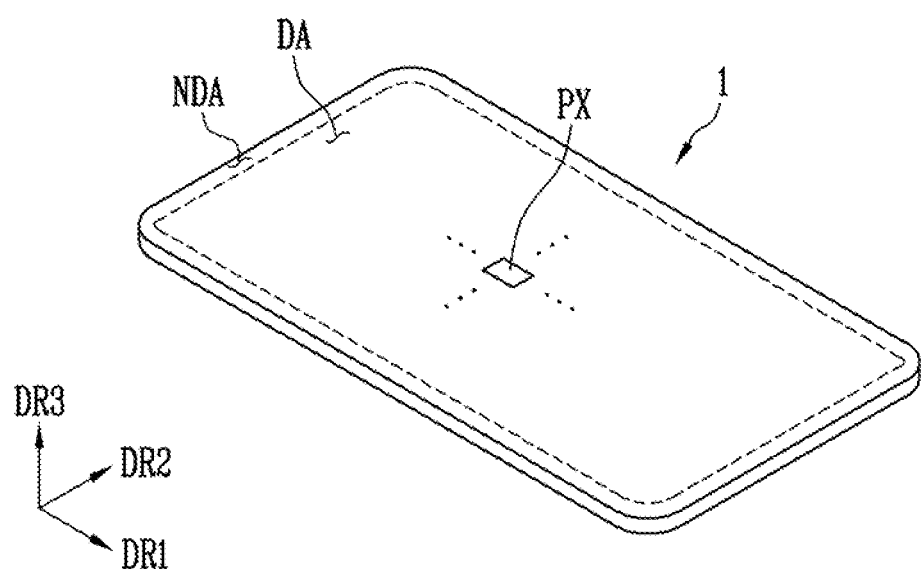
FIG. 1 is a perspective view of a display device according to an embodiment.

Embodiments of the disclosure may be modified in various manners and have various forms. Therefore, specific embodiments will be illustrated in the drawings and will be described in detail in the specification. However, it should be understood that the disclosure is not intended to be limited to the disclosed specific forms, and the disclosure includes all modifications, equivalents, and substitutions within the features and technical scope of the disclosure.

The disclosure is directed to a display device. Hereinafter, a display device according to an embodiment is described with reference to the accompanying drawings.

FIG. 1 is a perspective view of a display device according to an embodiment.

The display device 1 can provide light. Referring to FIG. 1, in an embodiment, the display device 1 includes a pixel PX that displays an image. The display device 1 further includes a driving circuit unit, such as a scan driver and a data driver that drive the pixel PX, lines, and pads.

The display device 1 includes a display area DA and a non-display area NDA. The non-display area NDA refers to the surface area of the display device except for the display area DA. Light is emitted from the display area DA. The non-display area NDA surrounds at least a portion of the display area DA. The display area DA is parallel to a plane defined by a first direction DR1 and a second direction DR2 that crosses the first direction DR1. The display area DA emits light in a third direction DR3 that is normal to the plane of the first direction DR1 and the second direction DR2.

The display area DA is where the pixel PX is disposed. The non-display area NDA is where no pixel PX is disposed. The driving circuit unit, the lines, and the pads connected to the pixel PX of the display area DA are disposed in the non-display area NDA.

The pixels PX may be arranged in various structures. For example, the pixels PX may be arranged in a stripe or PENTILE™ arrangement structure, etc. However, embodiments of the disclosure are not necessarily limited thereto, and the pixels may be arranged in other structures in other embodiments.

The pixel PX includes a plurality of sub-pixels. According to an embodiment, each of the plurality of sub-pixels emits a different color, and the plurality of sub-pixels form one pixel unit. For example, the pixel PX includes a first sub-pixel that emits light of a first color, such as red, a second sub-pixel that emits light of a second color, such as green, and a third sub-pixel that emits light of a third color, such as blue. However, embodiments of the disclosure are not necessarily limited thereto.

Figure 2:
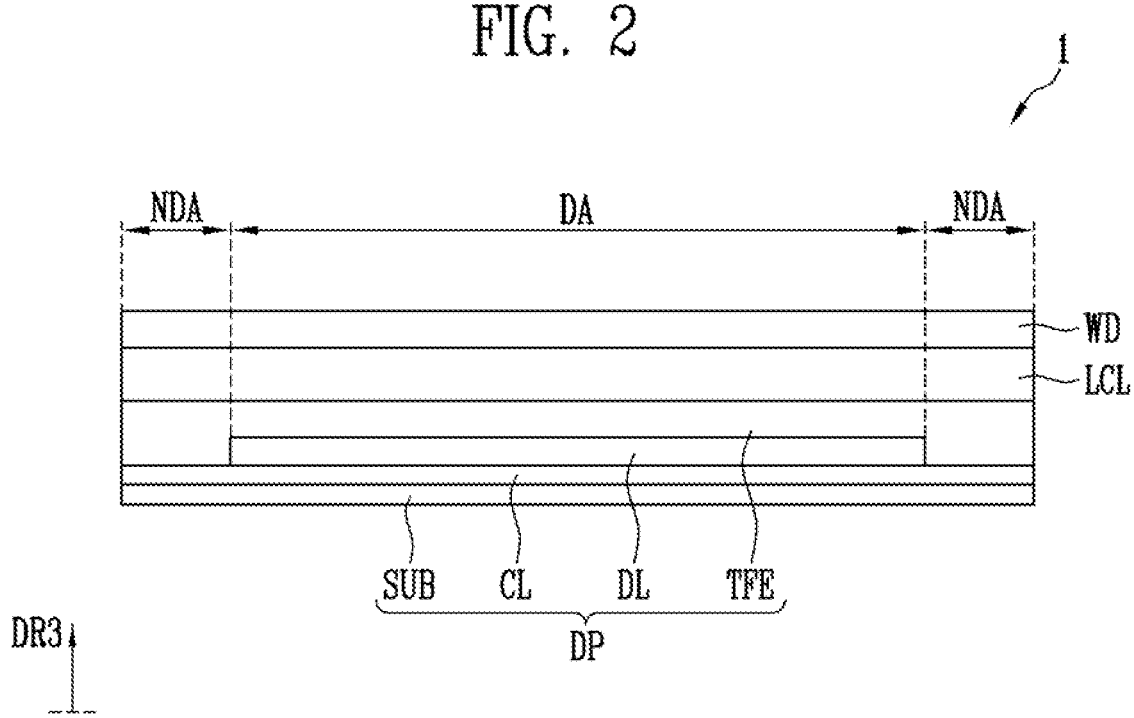
FIG. 2 is a cross-sectional view of a display device according to an embodiment.

FIG. 2 is a cross-sectional view of a display device according to an embodiment.

Referring to FIG. 2, in an embodiment, the display device 1 includes a display panel DP and a light control layer LCL. The display device 1 further includes a window WD. For example, the display panel DP, the light control layer LCL, and the window WD are sequentially stacked in the third direction DR3.

The display panel DP includes a light emitting element. According to an embodiment, the light emitting element is a self-emission element. For example, the self-emission element one of an organic light emitting diode, a quantum dot light emitting diode, an inorganic material-based micro light emitting element, such as a micro LED, or an inorganic material-based nano light emitting element, such as a nano LED. However, embodiments of the disclosure are not necessarily limited to the above-described examples. Hereinafter, for convenience of description, the disclosure is described based on a case in which the self-emission element is an organic light emitting element.

The display panel DP includes a substrate SUB, a circuit element layer CL, a display element layer DL, and a thin film encapsulation layer TFE.

The substrate SUB is a base member of the display panel DP. The substrate SUB may be a rigid or flexible substrate or film. For example, the substrate SUB is one of a rigid substrate formed of glass or tempered glass, or a flexible substrate formed of plastic or metal. The substrate may include at least one insulating layer. A material and/or a physical property of the substrate SUB are/is not particularly limited. In an embodiment, the substrate SUB is substantially transparent. For example, light can pass through the substrate with a predetermined transmittance. In another embodiment, the substrate SUB is translucent or opaque. In addition, in an embodiment, the substrate SUB includes a reflective material.

The circuit element layer CL is disposed on the substrate SUB. The circuit element layer CL includes a circuit element and one or more interlayer insulating layers. The circuit element includes signal lines and a driving circuit that drives the pixel PX. For example, the circuit element includes a plurality of transistors and a storage capacitor.

The display element layer DL is disposed on the circuit element layer CL. The display device layer DL includes a self-emission element. For example, the self-emission element is an organic light emitting element. The display element layer DL may further include an insulating layer that includes a pixel defining layer. According to an embodiment, the display element layer DL overlaps the display area DA, but does not overlap the non-display area NDA in a plan view.

The thin film encapsulation layer TFE is disposed on the display element layer DL. The thin film encapsulation layer TFE encapsulates at least a portion of the display element layer DL. The thin film encapsulation layer TFE may have a single layer structure or multiple layer structure. In an embodiment, the thin film encapsulation layer TFE includes a plurality of insulating layers that cover the display element layer DL. The thin film encapsulation layer TFE includes at least one inorganic layer and at least one organic layer. For example, the thin film encapsulation layer TFE has a structure in which an inorganic layer and an organic layer are alternately stacked. According to an embodiment, the thin film encapsulation layer TFE is an encapsulation substrate disposed on the display element layer DL and bonded by a sealant.

The light control layer LCL is disposed on the display panel DP. The light control layer LCL is interposed between the display panel DP and the window WD. The light control layer LCL changes a polarization direction of light. A detailed description of the light control layer LCL is provided below with reference to FIG. 3.

The window WD is disposed on the light control layer LCL. The window WD protects the display panel DP and the light control layer LCL from external impacts, and provides an input surface and/or a display surface to a user. According to an embodiment, the window WD has a substrate or film structure. The window WD may have a single layer structure or a multiple layer structure. All or a portion of the window WD may be flexible.

Figure 4:
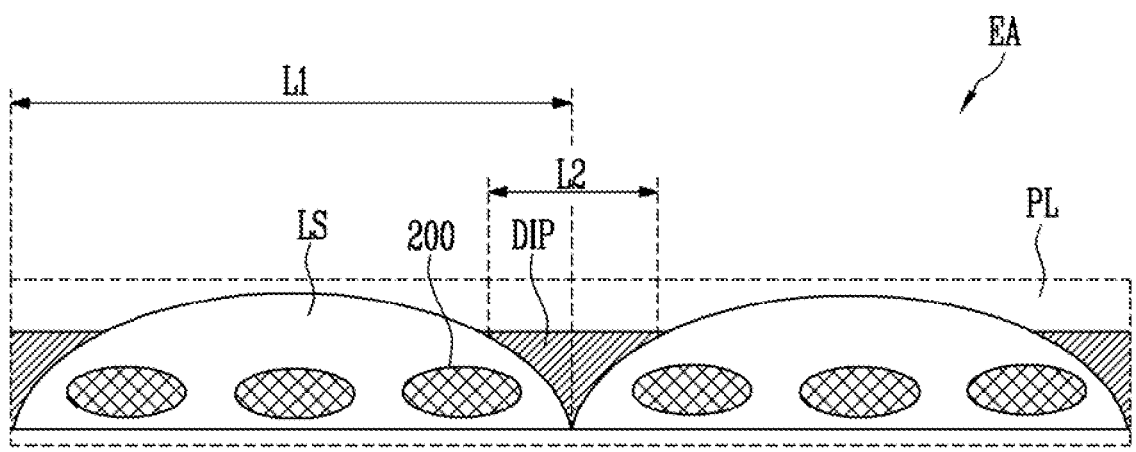
FIG. 4 is an enlarged view of an area EA FIG. 3.
Figure 5:
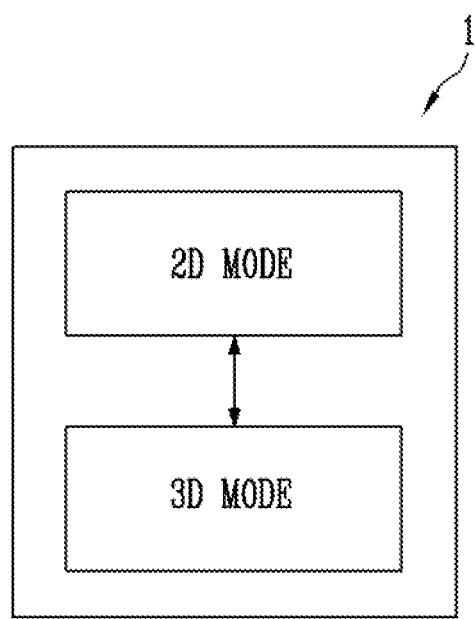
FIG. 5 is a block diagram of an operation mode of a display device according to an embodiment.

Hereinafter, the light control layer LCL of the display device 1 according to an embodiment is described with reference to FIGS. 3 to 5.

Figure 3:
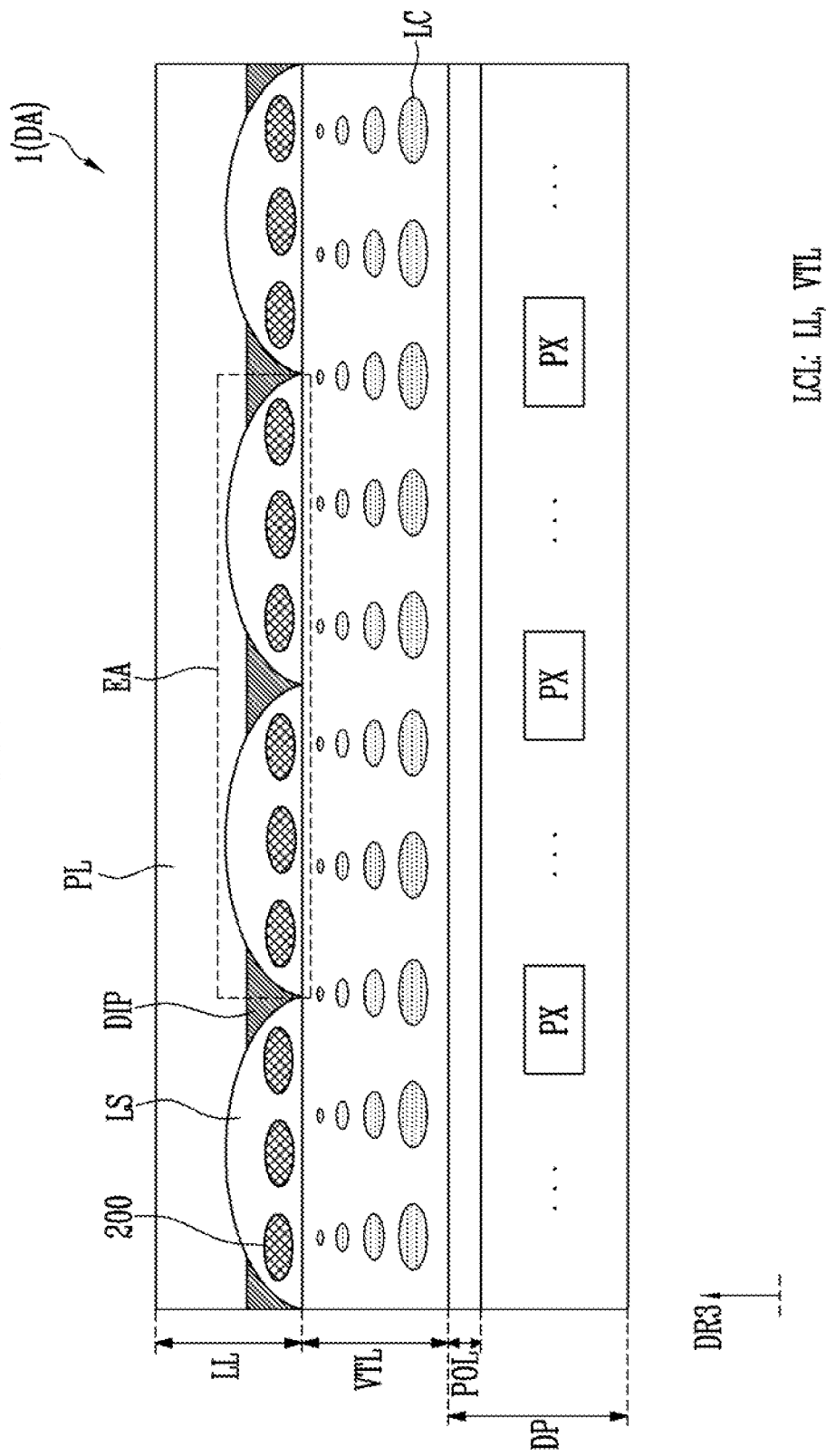
FIG. 3 is a cross-sectional view of a display device according to an embodiment.

FIG. 3 is a cross-sectional view of a display device according to an embodiment. FIG. 4 is an enlarged view of an EA area of FIG. 3. FIG. 5 is a block diagram of an operation mode of a display device according to an embodiment. A repeated description of components described above may be summarized or omitted.

Referring to FIG. 3, in an embodiment, the display panel DP includes a plurality of pixels PX. According to an embodiment, each of the pixels PX outputs one of red light, green light, or blue light. However, embodiments of the disclosure are not necessarily limited thereto. In other embodiments, light of various other colors for full-color implementation is emitted.

According to an embodiment, the display panel DP further includes a polarization layer POL. The polarization layer POL is disposed on the pixels PX. Accordingly, light emitted from the pixels PX passes through the polarization layer POL and into a variable light transmission layer VTL. Light emitted from the pixels PX and that passes through the polarization layer POL may be referred to input polarization light. According to an embodiment, the polarization layer POL serves as an anti-reflection layer. For example, the polarization layer POL reduces a reflectance of external light incident from outside of the display device 1. According to an embodiment, the polarization layer POL includes a phase retarder and/or a polarizer. The phase retarder is one of a film type or a liquid crystal coating type, and includes a $\lambda/2$ phase retarder and/or a $\lambda/4$ phase retarder. The polarizer is one of a film type or a liquid crystal coating type.

The light control layer LCL is disposed on the display panel DP. According to an embodiment, the display device 1 includes the light control layer LCL to implement a light field display. For example, referring to FIG. 5, the display device 1 may operate in a 2-dimension (2D) image mode or a 3-dimension (3D) image mode. For example, the display device 1 includes a controller that changes an operation mode, and the controller can change the operation mode of the display device 1 based on one or more of a preset criterion or a user input, etc. The controller is a circuit that is implemented by one or more of software, hardware, firmware, or an application. However, embodiments of the disclosure are not necessarily limited to a specific example.

According to an embodiment, when the display device 1 operates in 3D image mode, the display device 1 presents a stereoscopic image by forming a light field that is expressed by a vector distribution that includes an intensity and a direction of light in space using a lens layer LL. A light field display that is implemented when the display device 1 operates in the 3D image a presents a more natural stereoscopic image because depth, side surfaces, etc., of an object can be seen. Therefore, a light field display can have various uses by convergence with augmented reality (AR) technology.

In addition, the display device 1 can also operate in 2D image mode. When the display device 1 operates in 2D image mode, the display device 1 emits an image entirely to the display area DA.

That is, according to an embodiment, the display device 1 can selectively operate 2D image mode or 3D image mode, and the operation mode is appropriately selected according to an image reproduction environment.

According to an embodiment, the light control layer LCL includes the variable light transmission layer VTL and the lens layer LL. According to an embodiment, an insulating layer or a base layer is interposed between each layer. The insulating layer includes a transparent insulating material.

The variable light transmission layer VTL may be disposed on the polarization layer POL of the display panel DP. The variable light transmission layer VTL is disposed on a rear surface of the lens layer LL.

According to an embodiment, the variable light transmission layer VTL is driven in a twisted nematic (TN) liquid crystal mode that has a $\lambda/2$ phase difference. However, embodiments are not necessarily limited thereto, and in other embodiments, the variable light transmission layer VTL may be driven in a liquid crystal mode such as vertical alignment (VA), optical compensated bend (OCB), or electrically controlled birefringence (ECB).

According to an embodiment, the variable light transmission layer VTL includes liquid crystal molecules LC. An alignment state of the liquid crystal molecules LC changes based on an electrical signal received by the variable light transmission layer VTL. For example, the variable light transmission layer VTL includes first and second electrodes that receive electrical signals. An orientation of the liquid crystal molecules LC changes based on the electrical signals received by the first electrode and the second electrode. According to an embodiment, the first electrode and the second electrode face each other. For example, the first electrode is disposed on one side of the liquid crystal molecules LC, and the second electrode is disposed on another side of the liquid crystal molecules LC.

A reference voltage for turning the driving of the variable light transmission layer VTL on or off is supplied to the first electrode. According to an embodiment, the first electrode includes a transparent conductive material, such as ITO, etc.

A driving voltage that turns the driving of the variable light transmission layer VTL on or off is supplied to the second electrode. According to an embodiment, the second electrode includes a transparent conductive material, such as ITO, etc.

For example, FIG. 3 shows a structure in which the liquid crystal molecules LC are aligned in a specific direction when a voltage is not supplied to the second electrode.

The lens layer LL is disposed on the variable light transmission layer VTL. The lens layer LL includes lenses LS that refract the light received from the pixels PX and a polarization pattern DIP disposed adjacent to the lenses LS. The lens layer LL further includes an outer layer PL. According to an embodiment, the polarization pattern DIP is disposed between adjacent lenses LS.

The lens layer LL may be implemented in various structures. For example, in embodiments, the lens layer LL can be implemented as on of a lenticular lens array or a micro lens array, etc. The structure of the lens layer LL will be described below with reference to FIGS. 13 to 17.

The lens layer LL may or may not refract light passing through the variable light transmission layer VTL. For example, when the display device 1 operates in 2D image mode, the lens layer LL transmits an image received from the display panel DP as is, and when the display device 1 operates in 3D image mode, the lens layer LL separates viewing areas of the image received from the display panel DP. When the display device 1 operates in 3D image mode, the lens layer LL cause a multi-viewpoint image to be formed by the display panel DP in a corresponding viewing area for each viewpoint image based on, for example, a diffraction and refraction phenomenon of light.

The lenses LS are disposed on the variable light transmission layer VTL. The lenses LS are interposed between the outer layer PL and the variable light transmission layer VTL. The lenses LS form an interface with the outer layer PL.

The lenses LS refract light received from the display panel DP according to a driving state of the variable light transmission layer VTL. For example, when the liquid crystal molecules LC of the variable light transmission layer VTL are in a first alignment state, such as a 3D image mode alignment state, the lenses LS refract light, and thus a light field is formed. For example, a stereoscopic image is presented by the lenses LS. Alternatively, when the liquid crystal molecules LC of the variable light transmission layer VTL are in a second alignment state, such as a 2D image mode alignment state, that differs from the first alignment state, the lenses LS do not refract light, and in this case, a 2D image is presented.

The lenses LS include a plurality of lenses. The plurality of lenses are micro scale lenses. However, embodiments of the disclosure are not necessarily limited to the above.

According to an embodiment, the lenses LS may be referred to as a lens array.

The lenses LS are a liquid crystal type lens array. For example, the lenses LS include lens liquid crystal molecules 200. The lens liquid crystal molecules 200 are aligned in one direction.

According to an embodiment, and depending on an operation state of the display device 1, the outer layer PL and the lenses LS that include the lens liquid crystal molecules 200 might or might not form a refraction surface.

For example, when the display device 1 operates in 3D image mode, the outer layer PL and the lenses LS that include the lens liquid crystal molecules 200 form an interface that refracts light. When the display device 1 operates in 2D image mode, the interface between the outer layer PL and the lenses LS that include the lens liquid crystal molecules 200 do not refract light.

The polarization pattern DIP is disposed between adjacent lenses LS. For example, the polarization pattern DIP overlaps a boundary area between adjacent lenses LS. According to an embodiment, a portion of the polarization pattern DIP fills a groove formed between the lenses LS.

The polarization pattern DIP includes a pattern structure that has a one polarization direction. For example, the polarization pattern DIP includes a phase retarder and/or a polarizer. According to an embodiment, the phase retarder is one of a film type or a liquid crystal coating type, and includes a λ/2 (90 degrees) phase retarder. The polarizer has one of a film type or a liquid crystal coating type. However, embodiments of the disclosure are not necessarily limited to the above-described example, and in other embodiments, the polarization pattern DIP has structures having another predetermined polarization direction.

For example, a pattern structure of the polarization pattern DIP differs from a polarization direction of the light received from the display panel DP. According to an embodiment, the polarization direction of the polarization pattern DIP differs from a direction of input polarization light emitted to the variable light transmission layer VTL from the pixels PXL.

According to an embodiment, the polarization direction of the polarization pattern DIP differs from the direction of the input polarization light. According to an embodiment, the polarization direction of the polarization pattern DIP is orthogonal to the direction of the input polarization light. The polarization direction of the polarization pattern DIP differs from the direction of the input polarization light by 90 degrees.

According to an embodiment, the polarization pattern DIP is an adaptive light blocking pattern. For example, whether the polarization pattern DIP blocks light is determined based on an arrangement state of the liquid crystal molecules LC that determine the image mode of the display device 1. A detailed description thereof will be provided below.

According to an embodiment, since the polarization pattern DIP has a polarization direction in a predetermined direction, light is blocked or transmitted according to the polarization direction of the light. For example, since the polarization direction of the polarization pattern DIP is orthogonal to the direction of the input polarization light, when a phase of the input polarization light is delayed by 90 degrees, the polarization pattern DIP transmits the delayed input polarization light. When the phase of the input polarization light is not separately changed and the input polarization light is provided to the polarization pattern DIP, the polarization pattern DIP blocks the provided light. Using a similar method, when the display device 1 operates in a 2D image mode, the polarization pattern DIP transmits light, and when the display device 1 operates in 3D image mode, the polarization pattern DIP may block light.

According to an embodiment, the polarization pattern DIP has a length less than that of the lenses LS. For example, referring to FIG. 4, in an embodiment, the lenses LS have a first length L1, and the polarization pattern DIP has a second length L2. The second length L2 may be less than the first length L1. According to an embodiment, the first length L1 and the second length L2 are defined in a direction in which the lenses LS are spaced apart from each other.

According to an embodiment, the second length L2 is 0.2 to 0.4 times the first length L1. Alternatively, according to an embodiment, the second length L2 is 0.25 to 0.35 times the first length L1. Alternatively, according to an embodiment, the second length L2 is about 0.3 times the first length L1. When a length relationship of the lenses LS and the polarization pattern DIP satisfies one of the numerical ranges, and when the display device 1 operates in 3D image mode, an interference phenomenon between light emitted from adjacent lenses LS is reduced while minimizing a luminance reduction of the display device 1.

For example, as described above, when the display device 1 operates in 3D image mode, the polarization pattern DIP may block light. Accordingly, interference between light emitted from adjacent lenses LS is prevented, thereby reducing a crosstalk phenomenon. However, since the polarization pattern DIP blocks a portion of the light, luminance may be reduced in the display area DA of the display device 1. However, when the length relationship of the lenses LS and the polarization pattern DIP satisfies the above-described numerical ranges, crosstalk of the lenses LS can be sufficiently reduced without significantly reducing the luminance.

For example, experimentally, to prevent light interference between adjacent lenses LS, a boundary area between the adjacent lenses LS should be blocked. However, blocking the boundary area may be sufficient, and an excessively long polarization pattern DIP might not be needed. For example, after the length of the polarization pattern DIP exceeds a certain level, a crosstalk does not decrease proportionally as the length of the polarization pattern DIP increases. Accordingly, when the length relationship of the lenses LS and the polarization pattern DIP satisfies the above-described numerical ranges, the crosstalk reduction effect of the polarization pattern DIP is maximized, and the polarization pattern DIP does not unnecessarily extend, thereby sufficiently securing the luminance.

The outer layer PL is disposed outside the lens layer LL. The outer layer PL is disposed on the lenses LS and the polarization pattern DIP.

The outer layer PL forms the interface with the lenses LS to change a light path. The outer layer PL has a preset refractive index. According to an embodiment, when the display device 1 operates in 3D image mode, the interface refracts light, and when the display device 1 operates in 2D image mode, the interface does not refract light.

According to an embodiment, the outer layer PL includes an isotropic polymer material. For example, the isotropic polymer material includes at least one of an acrylic resin, polycarbonate, or cycloolefin polymer (COP). However, embodiments of the disclosure are not necessarily limited to the above-described example.

Structures of the light control layer LCL and the display panel DP are not necessarily limited to the above-described examples. According to an embodiment, an insulating layer, an additional polarization layer, etc., are further disposed adjacent to each layer of the light control layer LCL and the display panel DP.

Next, image modes of the display device 1 are described with reference to FIGS. 6 to 9. A repeated description of components described above may be summarized or omitted.

Figure 6:
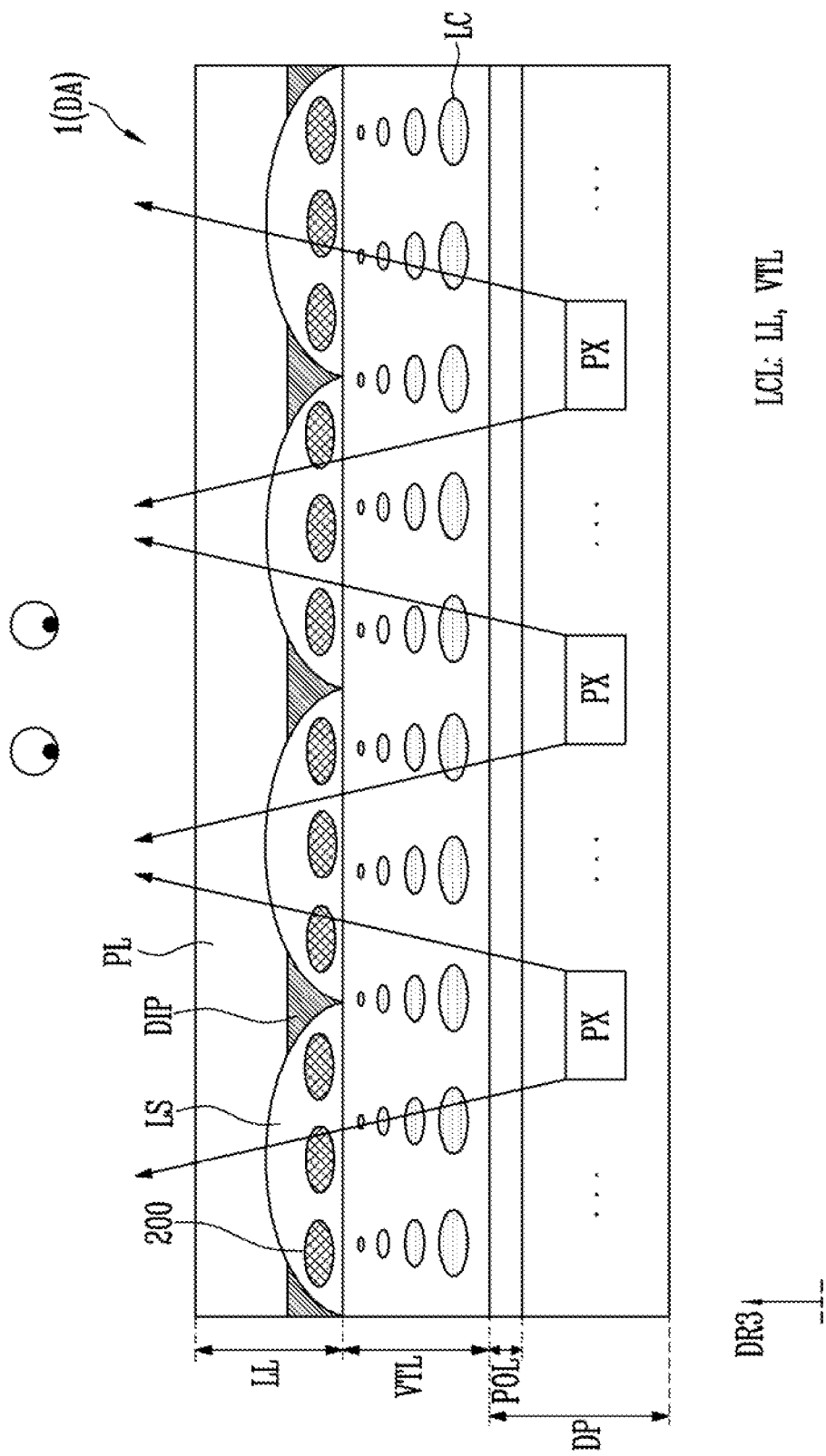
FIGS. 6 and 7 are cross-sectional views of a 2D image mode of a display device according to an embodiment.
Figure 7:
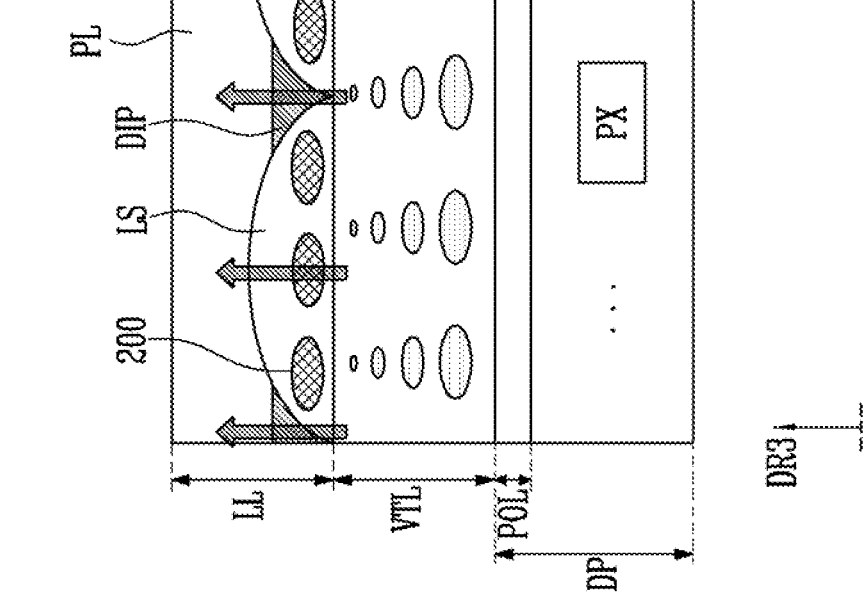
Figure 8:
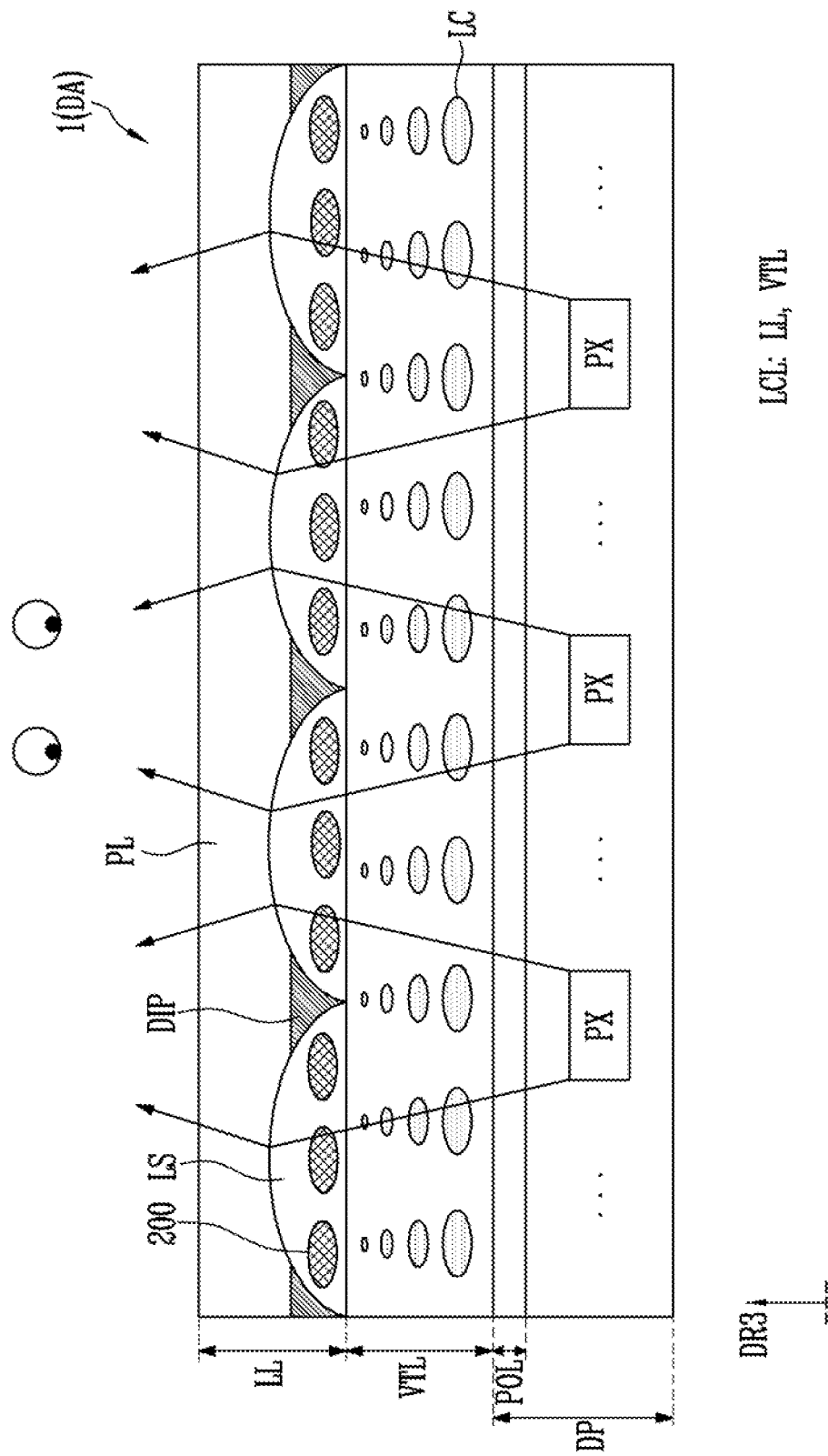
FIGS. 8 and 9 are cross-sectional views of a 3D image mode of the display device according to an embodiment.
Figure 9:
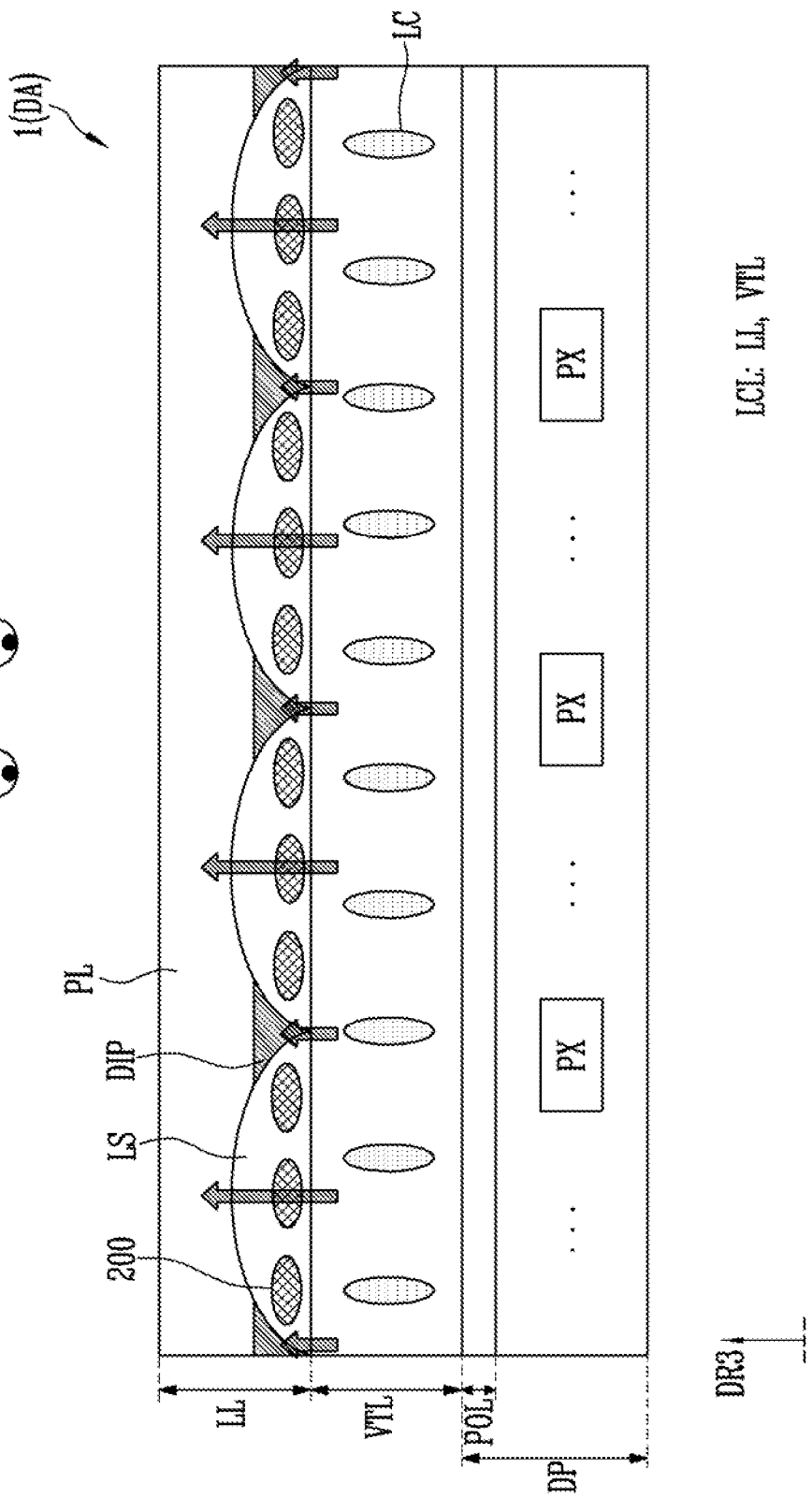

FIGS. 6 and 7 are cross-sectional views of a 2D image mode of a display device. FIGS. 8 and 9 are cross-sectional views of a 3D image mode of a display device.

Referring to FIGS. 6 and 7, in an embodiment, the display device 1 operate in 2D image mode. When the display device 1 operates in 2D image mode, the user perceives a 2D image.

When the display device 1 operates in 2D image mode, light emitted from the pixels PX passes through the polarization layer POL, the variable light transmission layer VTL, and the lens layer LL to the user.

According to an embodiment, when the display device 1 operates in 2D image mode, light emitted from the pixels PX passes through the polarization layer POL and is provided to the variable light transmission layer VTL. Hereinafter, for convenience of description, the light passing through the polarization layer POL is referred to as the input polarization light.

According to an embodiment, when the display device 1 operates in 2D image mode, no separate voltage is applied to the liquid crystal molecules LC of the variable light transmission layer VTL. For example, due to the alignment state of the liquid crystal molecules LC, the phase of the input polarization light that passes through the variable light transmission layer VTL may be delayed (hereinafter referred to as delayed-phase input polarization light). For example, the phase of the input polarization light changes by 90 degrees when the input polarization light passes through the liquid crystal molecules LC.

According to an embodiment, the delayed-phase input polarization light that has passed through the variable light transmission layer VTL enters the lens layer LL. According to an embodiment, the delayed-phase input polarization light passes through the lenses LS and the outer layer PL to the user.

For example, the polarization direction of the delayed-phase input polarization light is orthogonal to an orientation direction of the lens liquid crystal molecules 200 of the lenses LS, and in this case, the lenses LS have a refractive index a same as that of the outer layer PL. For example, the outer layer PL has a preset refractive index, the polarization direction of the delayed-phase input polarization light and the orientation direction of the lens liquid crystal molecules 200 are orthogonal to each other, and thus the lenses LS have a minimum refractive index that is the same as the preset refractive index. Accordingly, the delayed phase input polarization light is not refracted between the lenses LS and the outer layer PL.

However, according to an embodiment, the polarization direction of the delayed-phase input polarization light is the same as the polarization direction of the polarization pattern DIP. Accordingly, the polarization pattern DIP transmits the delayed-phase input polarization light. For example, the delayed-phase input polarization light is not blocked by the polarization pattern DIP and is output across the display area DA.

For example, when the display device 1 operates in 2D image mode, the polarization pattern DIP operates in a first mode, such as a transmission mode, in which light is transmitted. Accordingly, according to an embodiment, the polarization pattern DIP adjacent to the lenses LS is not visually perceptible, and thus the display device 1 provides a high quality image.

Next, referring to FIGS. 8 and 9, in an embodiment, the display device 1 operates in a 3D image mode. When the display device 1 operates in 3D image mode, a user can visually perceive a 3D image.

When the display device 1 operates in 3D image mode, the light emitted from the pixels PX passes through the polarization layer POL, the variable light transmission layer VTL, and the lens layer LL to the user.

According to an embodiment, when the display device 1 operates in 3D image mode, the light emitted from the pixels PX passes through the polarization layer POL and is provided as the input polarization light.

According to an embodiment, when the display device 1 operates in 3D image mode, an electrical signal is applied to the liquid crystal molecules LC of the variable light transmission layer VTL. For example, a driving voltage that rotates the liquid crystal molecules LC is supplied to the first electrode in the variable light transmission layer VTL, and a reference voltage is supplied to the second electrode in the variable light transmission layer VTL. Accordingly, the liquid crystal molecules LC rotate and arrange themselves in one alignment state. For example, even though the input polarization light passes through the variable light transmission layer VTL, the phase of the input polarization light is not substantially changed. Accordingly, the polarization direction of the input polarization light provided to the variable light transmission layer VTL and the polarization direction of the input polarization light after passing through the variable light transmission layer VTL are substantially the same.

According to the embodiment, as the input polarization light transmits through the variable light transmission layer VTL, the phase of the input polarization light is maintained, not delayed (hereinafter referred to as undelayed input polarization light). The undelayed input polarization light enters the lens layer LL. According to an embodiment, the input polarization light transmitted through the variable light transmission layer VTL passes through the lenses LS and the outer layer PL and to the user.

For example, the polarization direction of the undelayed input polarization light corresponds to or is substantially the same as the orientation direction of the lens liquid crystal molecules 200 of the lenses LS, and the lenses LS have a refractive index greater than that of the outer layer PL. For example, the outer layer PL has a preset refractive index, and a phase retardation effect for the undelayed input polarization light is generated in the lens liquid crystal molecules 200, and thus the lenses LS have a high refractive index greater than the preset refractive index. Accordingly, the undelayed input polarization light is refracted between the lenses LS and the outer layer PL, and as a result, a light field that can provide a 3D image to the user is formed.

However, according to an embodiment, the polarization direction of the input polarization light passing through the variable light transmission layer VTL may differ from the polarization direction of the polarization pattern DIP. Accordingly, the polarization pattern DIP does not transmit the input polarization light passing through the variable light transmission layer VTL. For example, when viewed in a plan view, light at a position that overlaps the polarization pattern DIP is blocked and is not output, and light at a position that does not overlap the polarization pattern DIP is output through the lenses LS and the outer layer PL.

According to an embodiment, the polarization pattern DIP is disposed in the display device 1 to substantially prevent diffraction and aberration that occur between adjacent lenses LS. Accordingly, crosstalk in the lenses LS is reduced.

As described above, the display device 1 according to an embodiment can implement both a 2D image mode and a 3D image mode. Experimentally, when a light blocking member, etc., is disposed to prevent crosstalk in the lenses LS, the light blocking member may be visually recognized by a user during a 2D operation, and thus image sensitivity is reduced.

However, according to an embodiment, the polarization pattern DIP selectively blocks light when the display device 1 operates in 3D image mode. Accordingly, the polarization pattern DIP is not visually recognized when the display device 1 operates in 2D image mode, and thus an unnecessary object is not visually recognized in the display area DA.

For example, when the display device 1 operates in 3D image mode, the polarization pattern DIP may block light, thereby reducing crosstalk of the lenses LS and preventing the polarization pattern DIP from being substantially visually recognized. For example, when a 3D image is provided, since light is provided with specific directivity according to the image to be provided, even though the polarization pattern DIP blocks light at a position where the polarization pattern DIP is disposed, the user will not visually recognize this.

As a result, according to an embodiment, the display device 1 that prevents crosstalk of the lenses LS and increases image sensitivity and visual recognition is provided.

Disposition positions of the polarization pattern DIP are described with reference to FIGS. 10 to 12. A repeated description of components described above may be summarized or omitted.

Figure 10:
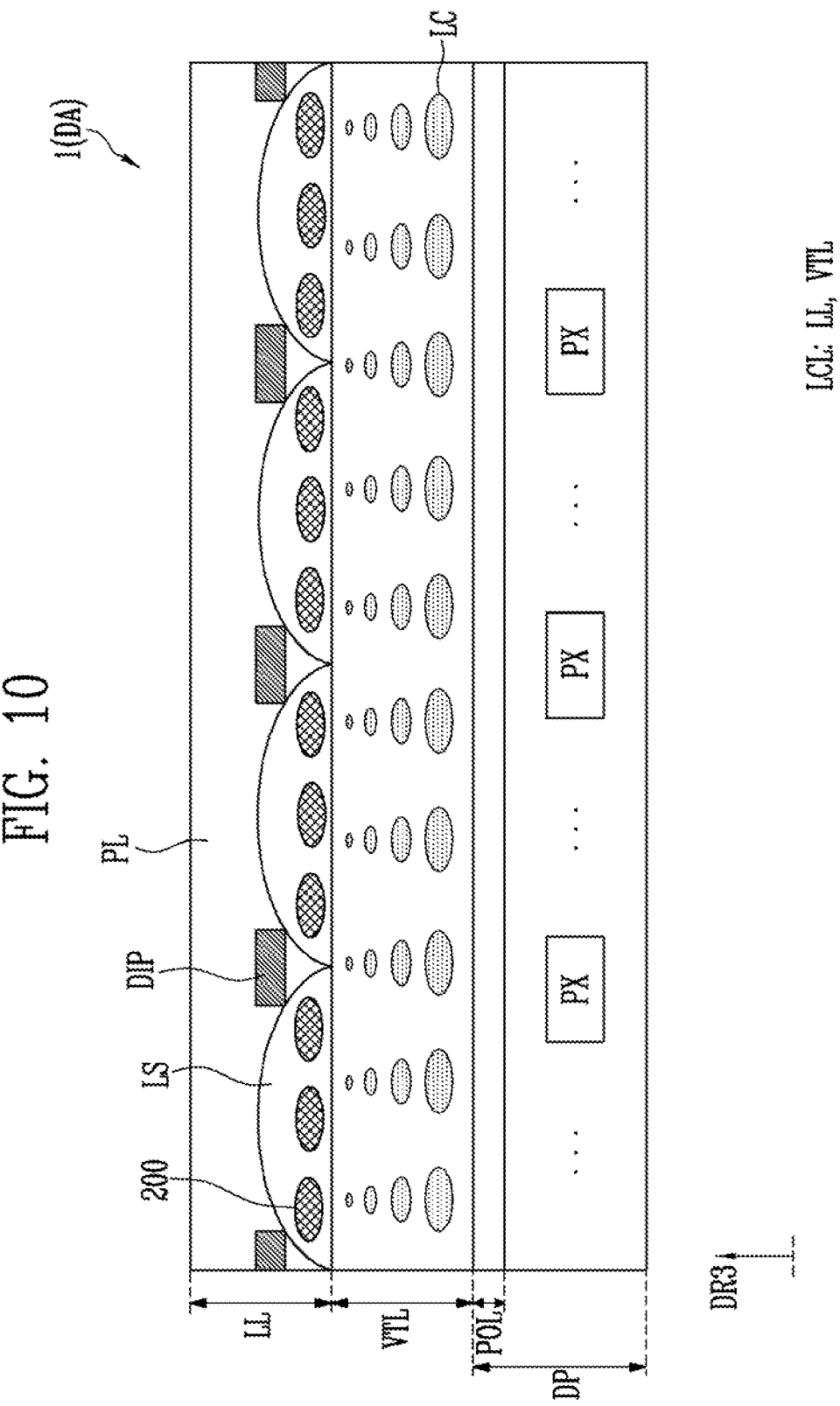
FIGS. 10 to 12 are cross-sectional views of a display device according to an embodiment.
Figure 11:
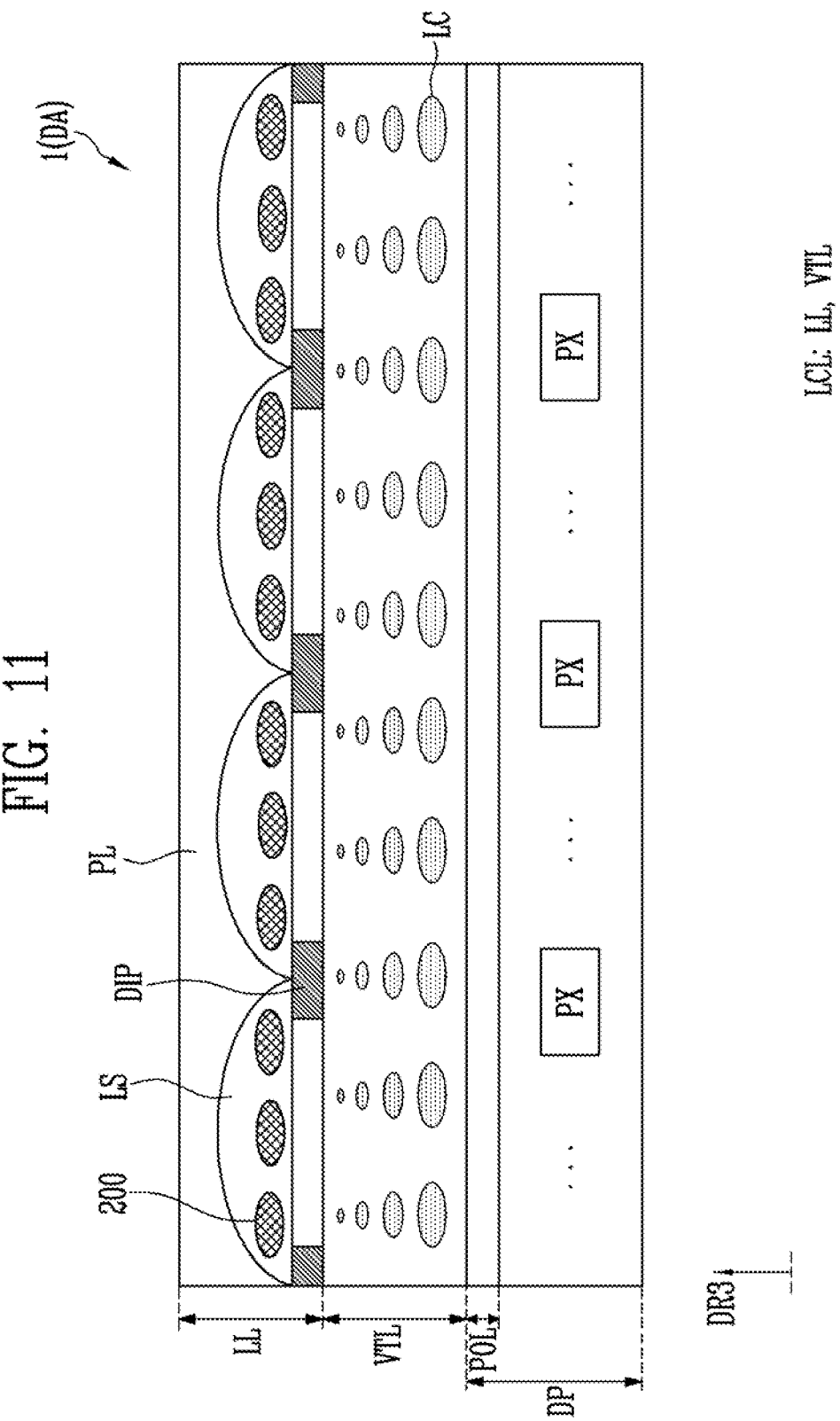
Figure 12:
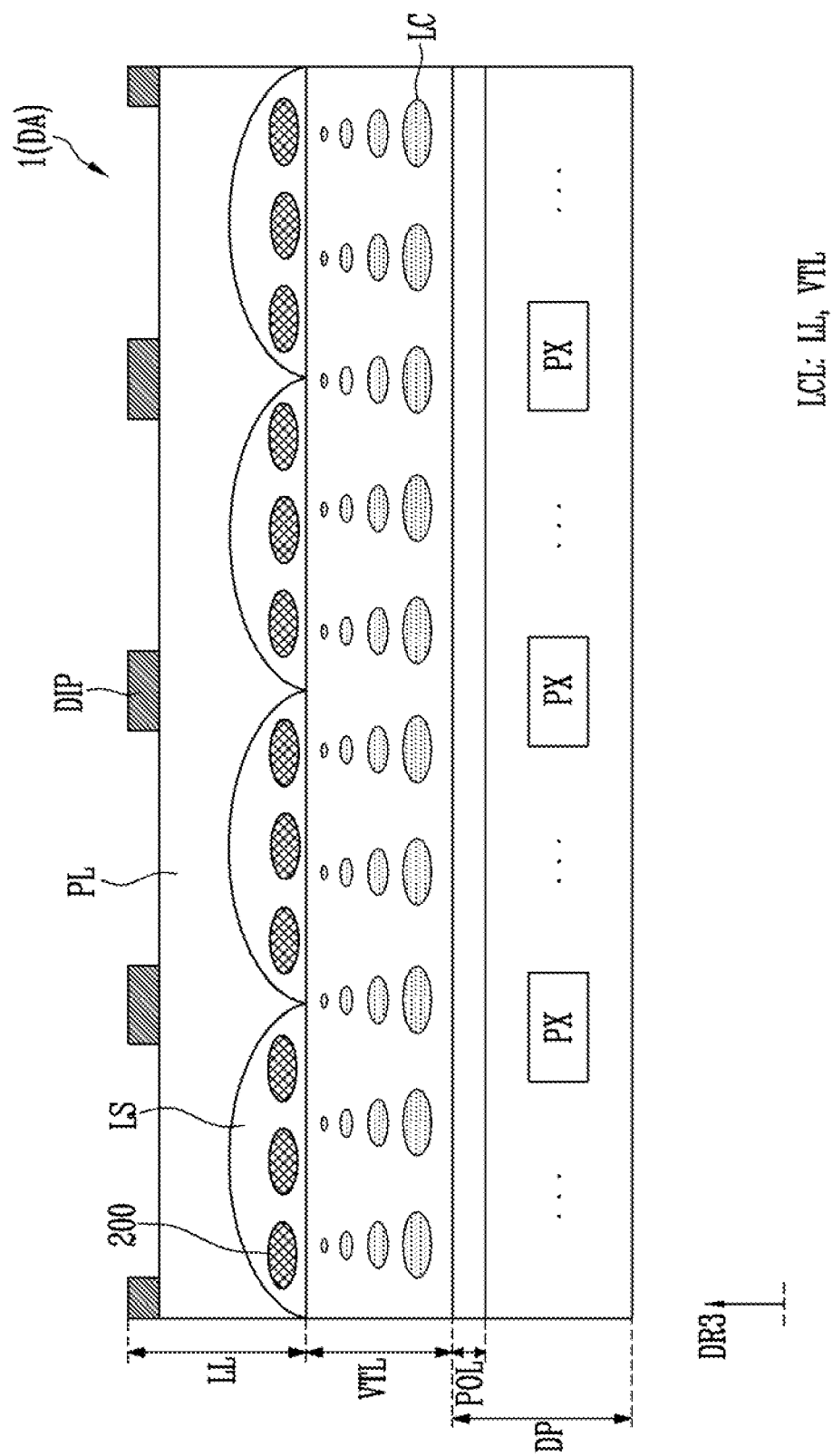

FIGS. 10 to 12 are cross-sectional views of a display device according to an embodiment. FIGS. 10 to 12 illustrate one position in which the polarization pattern DIP according to an embodiment can be disposed.

According to an embodiment, the position of the polarization pattern DIP may be variously changed. For example, as described above, the polarization pattern DIP is disposed between adjacent lenses LS. For example, the polarization pattern DIP effectively covers a gap between the adjacent lenses LS, thus reducing light crosstalk.

Alternatively, in an embodiment, referring to FIG. 10, the polarization pattern DIP is disposed on the lenses LS. The polarization pattern DIP overlaps edge portions of the adjacent lenses LS and a boundary area between the adjacent lenses LS, and the polarization pattern DIP is spaced apart from an inlet portion formed by the adjacent lenses LS.

Alternatively, in an embodiment, referring to FIG. 11, the polarization pattern DIP is disposed under or on a rear surface of the lenses LS. For example, the polarization pattern DIP is interposed between the lenses LS and the variable light transmission layer VTL.

Alternatively, in an embodiment, referring to FIG. 12, the polarization pattern DIP is disposed on the outer layer PL. The polarization pattern DIP is disposed outside the display device 1 and spaced apart from the lenses LS. For example, the outer layer PL is disposed between the polarization pattern DIP and the lenses LS, and thus the polarization pattern DIP and the lenses LS do not contact each other.

Hereinafter, a structure of the lens layer LL according to an embodiment is described with reference to FIGS. 13 to 17. A repeated description of components described above may be summarized or omitted.

Figure 13:
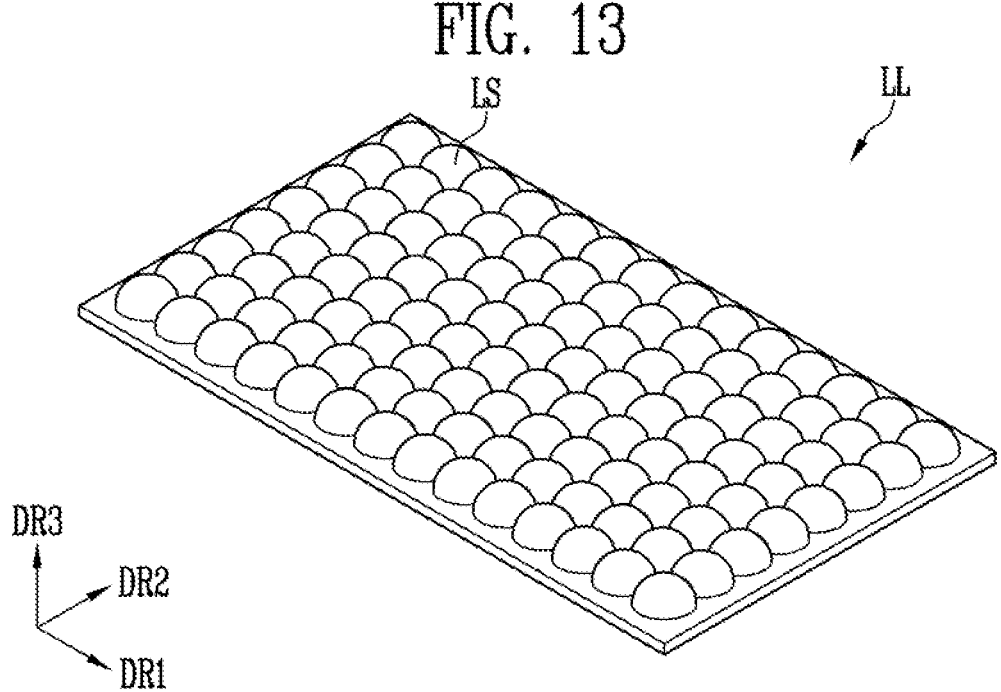
FIGS. 13 and 14 illustrate a structure of a lens layer according to an embodiment.
Figure 14:
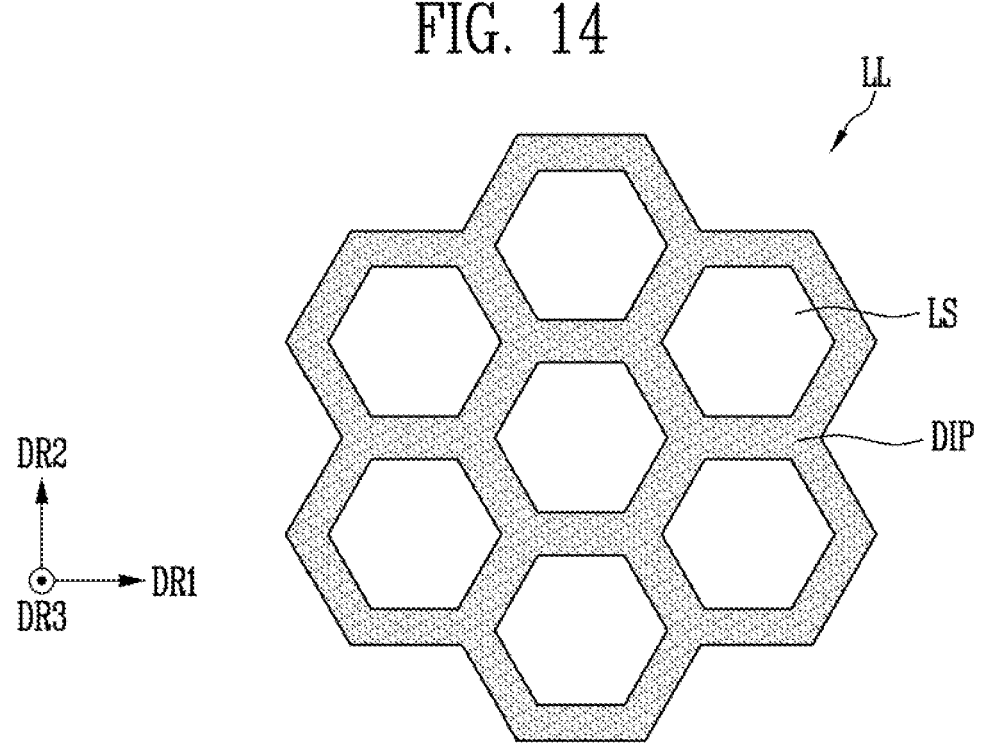

FIGS. 13 and 14 illustrate a structure of a lens layer according to an embodiment. FIG. 13 is a perspective view of a structure of a lens layer LL according to an embodiment. FIG. 14 is a plan view of a structure of a lens layer LL according to an embodiment.

Referring to FIGS. 13 and 14, in an embodiment, the lenses LS of the lens layer LL have a structure that includes a plurality of micro lenses that have a similar predetermined shape. For example, the lenses LS have one or more shapes selected from a rectangle, a pentagon, a hexagon, a circle, or an oval. However, embodiments of the disclosure are not necessarily limited to the above-described example. Light emitted from the pixels PX passes through the lenses LS that include the plurality of micro lenses to form a light field.

For example, according to an embodiment, the polarization pattern DIP is disposed between the lenses LS. For example, as the lenses LS include a plurality of micro lenses, the polarization pattern DIP surrounds each of the plurality of micro lenses in a plan view. For example, when each of the plurality of micro lenses has a hexagonal shape, as illustrated in FIG. 14, the polarization pattern DIP has a shape that surrounds the hexagonal shape.

Figure 15:
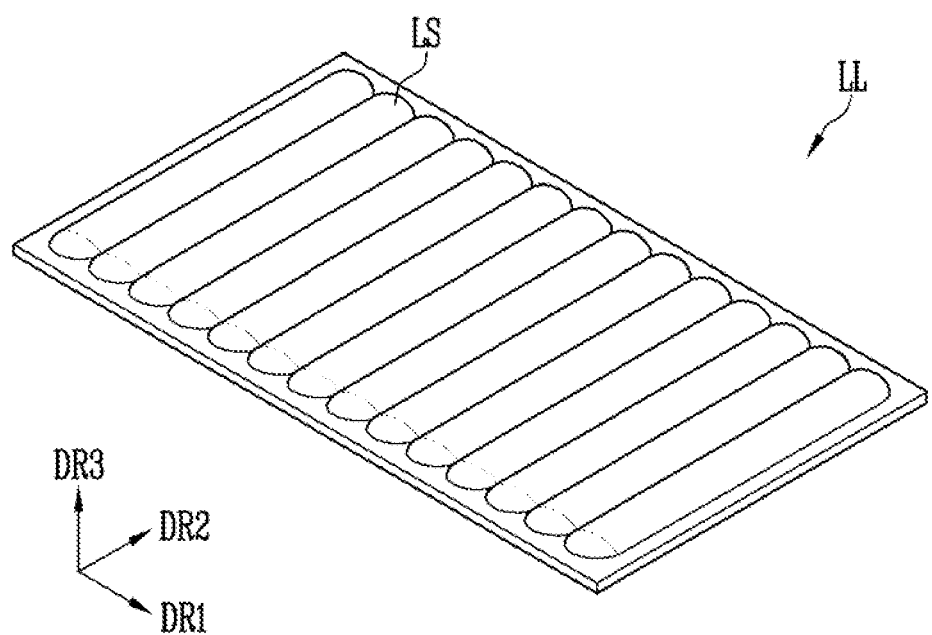
FIGS. 15 to 17 illustrate a structure of a lens layer according to an embodiment.
Figure 16:
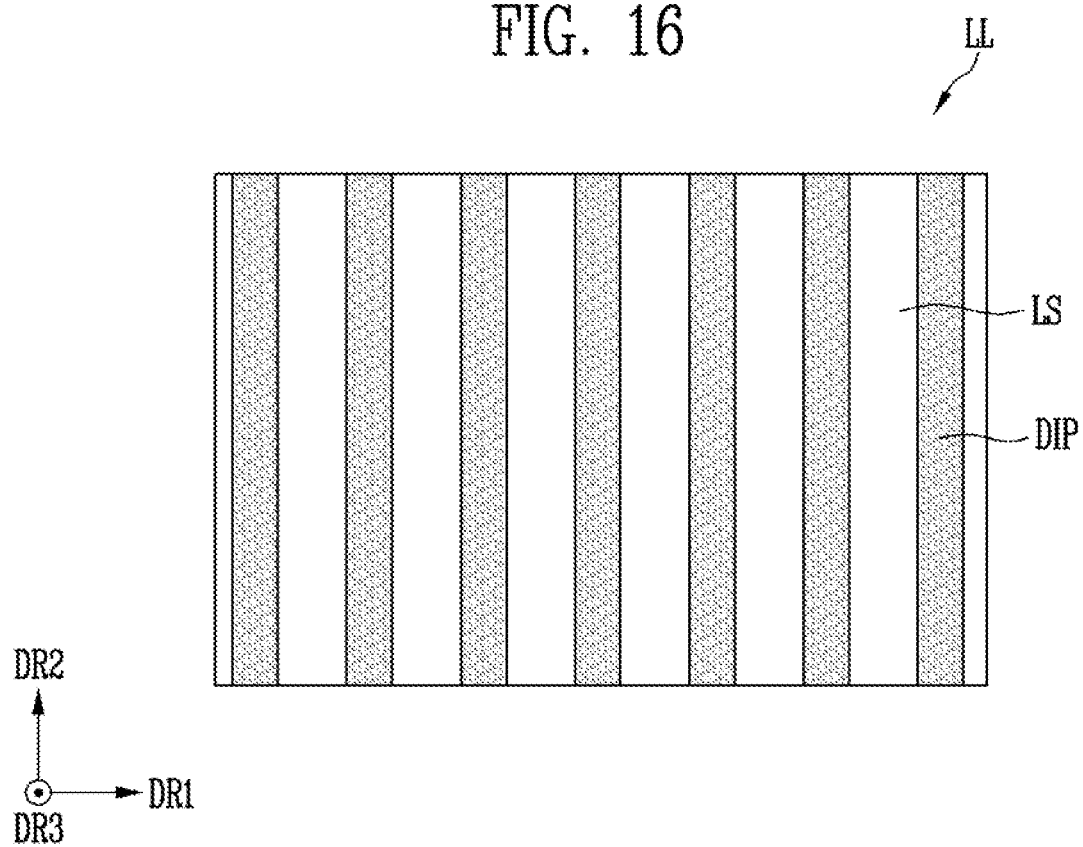
Figure 17:
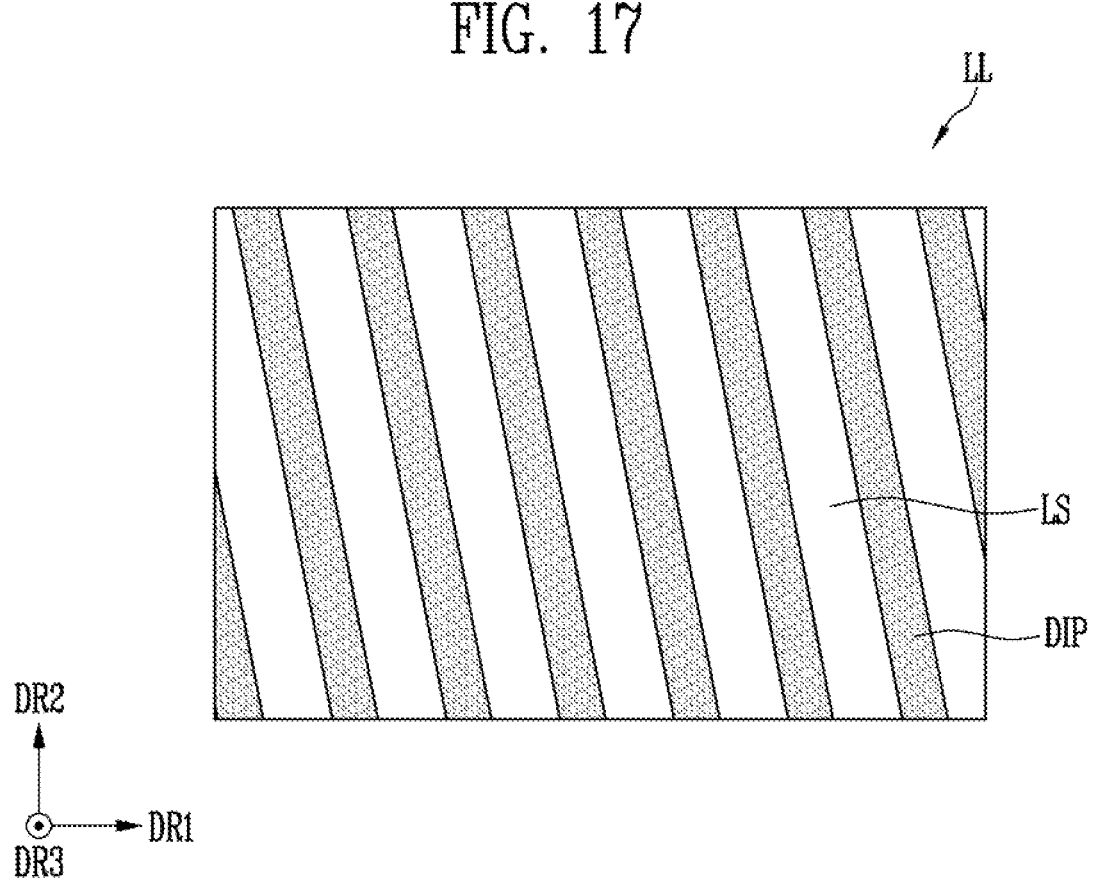

FIGS. 15 to 17 illustrate a structure of a lens layer according to an embodiment. FIG. 15 is a perspective view of a structure of a lens layer LL according to an embodiment. FIGS. 16 and 17 are plan views of a structure of a lens layer LL according to an embodiment. A repeated description of components described above may be summarized or omitted.

Referring to FIG. 15, in an embodiment, the lenses LS of the lens layer LL have a semi-cylindrical structure that extends in one direction, such as a second direction DR2. The lenses LS have a rectangular shape that is longer in the second direction DR2 than in the first direction DR1, in a plan view. For example, the lenses LS have a lenticular lens structure. Accordingly, light emitted from the pixels PX passes through the lenses LS that have the lenticular lens structure to form a light field.

For example, according to an embodiment, the polarization pattern DIP is disposed between the lenses LS as described above. For example, as the lenses LS have a lenticular lens structure, the polarization pattern DIP extends in one direction, such as the second direction DR2, when viewed in a plan view.

However, when the lenses LS have a lenticular lens structure, a direction in which the semi-cylindrical shape extends is not necessarily limited to a specific example. For example, referring to FIG. 16, in an embodiment, the lenses LS extend in the second direction DR2. For example, the lenses LS extend parallel to a direction of one side of the display device 1.

According to another example, in an embodiment, referring to FIG. 17, the lenses LS extend in an oblique direction that is not parallel to the first direction DR1 or the second direction DR2. For example, the extension direction of the lenses LS is not parallel to the direction of one side of the display device 1.

Although embodiments of the disclosure have been described with reference to drawings, those skilled in the art or those having a common knowledge in the art will understand that embodiments of the disclosure may be variously modified and changed without departing from the features and technical area of embodiments of the disclosure described in the claims that follow.

Therefore, the technical scope of the disclosure should not be limited to the embodiments described in the detailed description of the specification, but should be defined by the claims.

What is claimed is:

1. A display device, comprising:
   a display panel that includes a pixel;
   a variable light transmission layer disposed on the display panel and that includes liquid crystal molecules; and
   a lens layer disposed on the variable light transmission layer and that includes lenses and a polarization pattern,
   wherein the polarization pattern overlaps a boundary area between adjacent lenses,
   the display device operates in a 2D image mode that displays a 2D image or a 3D image mode that displays a 3D image, and
   the polarization pattern transmits light when the display device operates in the 2D image mode, or blocks light when the display device operates in the 3D image mode.

2. The display device according to claim 1, wherein the display panel provides input polarization light to the variable light transmission layer, and
   a polarization direction of the input polarization light and a polarization direction of the polarization pattern differ from each other.

3. The display device according to claim 2, wherein the polarization direction of the input polarization light and the polarization direction of the polarization pattern differ by 90 degrees.

4. The display device according to claim 1, wherein the lens layer further comprises an outer layer disposed on the lenses and the polarization pattern, and
   the outer layer and the lenses form an interface.

5. The display device according to claim 4, wherein the outer layer includes an isotropic polymer material.

6. The display device according to claim 4, wherein when the display device operates in 2D image mode, light is transmitted through the interface without refraction.

7. The display device according to claim 6, wherein the display panel provides input polarization light to the variable light transmission layer, and
   when the display device operates in 2D image mode, a phase of the input polarization light changes by 90 degrees as the input polarization light passes through the variable light transmission layer, and a polarization direction of the input polarization light that passed through the variable light transmission layer is a same as a polarization direction of the polarization pattern.

8. The display device according to claim 4, wherein when the display device operates in the 3D image mode, light is refracted at the interface.

9. The display device according to claim 8, wherein the display panel provides input polarization light to the variable light transmission layer, and
   when the display device operates in 3D image mode, a phase of the input polarization light is maintained as the input polarization light passes through the variable light transmission layer, and a polarization direction of the input polarization light that passed through the variable light transmission layer differs
   from a polarization direction of the polarization pattern.

10. The display device according to claim 1, wherein the lenses have a first length,
    the polarization pattern has a second length, and
    the second length is less than the first length.

11. The display device according to claim 10, wherein second length is 0.2 times to 0.4 times the first length.

12. The display device according to claim 1, wherein the polarization pattern is disposed on the lenses.

13. The display device according to claim 1, wherein the polarization pattern is disposed on a rear surface of the lenses.

14. The display device according to claim 1, wherein a portion of the polarization pattern fills a groove formed between the lenses.

15. The display device according to claim 1, wherein the lenses have a lenticular lens structure.

16. The display device according to claim 15, wherein the polarization pattern has a shape that extends in one direction.

17. The display device according to claim 1, wherein the lenses include a plurality of micro lenses, and
the plurality of micro lenses have at least one shape selected from a rectangle, a pentagon, a hexagon, a circle, or an oval.

18. The display device according to claim 17, wherein the polarization pattern has a shape that surrounds each of the plurality of micro lenses.

19. The display device according to claim 1, wherein the lenses include lens liquid crystal molecules that are aligned in one direction, and
the variable light transmission layer is driven in a twisted nematic (TN) liquid crystal mode.

20. A display device, comprising:
A display panel that includes a pixel;
a variable light transmission layer disposed on the display panel and that includes liquid crystal molecules; and
a lens layer disposed on the variable light transmission layer and that includes lenses and a polarization pattern,
wherein the polarization pattern overlaps a boundary area between adjacent lenses, and
the polarization pattern is an adaptive light blocking pattern in which light blocking is determined by an alignment state of the liquid crystal molecules of the variable light transmission layer.

21. A display device, comprising:
a display panel that includes a pixel;
a variable light transmission layer disposed on the display panel and that includes liquid crystal molecules;
a lens layer disposed on the variable light transmission layer and that includes lenses and a polarization pattern formed between adjacent lenses; and
an outer layer disposed on the lenses and the polarization pattern, wherein the outer layer and the lenses form an interface,
wherein the display device operates in a 2D image mode that displays a 2D image or a 3D image mode that displays a 3D image,
wherein when the display device operates in 2D image mode, light is transmitted through the interface without refraction, and
when the display device operates in the 3D image mode, light is refracted at the interface.

22. The display device according to claim 21, wherein the display panel provides input polarization light to the variable light transmission layer, and
when the display device operates in 2D image mode, a phase of the input polarization light changes by 90 degrees as the input polarization light passes through the variable light transmission layer, and a polarization direction of the input polarization light that passed through the variable light transmission layer is a same as a polarization direction of the polarization pattern.

23. The display device according to claim 21, wherein the display panel provides input polarization light to the variable light transmission layer, and
when the display device operates in 3D image mode, a phase of the input polarization light is maintained as the input polarization light passes through the variable light transmission layer, and a polarization direction of the input polarization light that passed through the variable light transmission layer differs
from a polarization direction of the polarization pattern.

24. The display device according to claim 21, wherein the display panel provides input polarization light to the variable light transmission layer, and
a polarization direction of the input polarization light and a polarization direction of the polarization pattern differ from each other.

* * * * *